US012760783B2

(12) United States Patent
Steidl et al.

(10) Patent No.: US 12,760,783 B2
(45) Date of Patent: Oct. 13, 2026

(54) VISCOUS TORSIONAL VIBRATION DAMPER OR VISCOUS TORSIONAL VIBRATION ABSORBER

(71) Applicant: Hasse & Wrede GmbH, Berlin (DE)

(72) Inventors: Michael Steidl, Berlin (DE); Charles Perumal, Berlin (DE); Dora Terjek, Kiskunfelegyhaza (HU)

(73) Assignee: Hasse & Wrede GmbH, Berlin (DE)

( * ) Notice: Subject to any disclaimer, the term of this patent is extended or adjusted under 35 U.S.C. 154(b) by 403 days.

(21) Appl. No.: 18/562,375

(22) PCT Filed: Jun. 23, 2022

(86) PCT No.: PCT/EP2022/067159
§ 371 (c)(1),
(2) Date: Nov. 20, 2023

(87) PCT Pub. No.: WO2022/268946
PCT Pub. Date: Dec. 29, 2022

(65) Prior Publication Data

US 2024/0247702 A1 Jul. 25, 2024

(30) Foreign Application Priority Data

Jun. 24, 2021 (DE) ..................... 10 2021 116 417.6

(51) Int. Cl.
*F16F 15/173* (2006.01)
*F16C 17/02* (2006.01)

(52) U.S. Cl.
CPC ............ *F16F 15/173* (2013.01); *F16C 17/02* (2013.01); *F16F 2222/08* (2013.01); (Continued)

(58) Field of Classification Search
None
See application file for complete search history.

(56) References Cited

U.S. PATENT DOCUMENTS 3,262,334 A 7/1966 Edwards
3,398,602 A 8/1968 Croset
(Continued)

FOREIGN PATENT DOCUMENTS

CN 101117982 A 2/2008
CN 102725549 A 10/2012
(Continued)

OTHER PUBLICATIONS

CN-105539872-A: English Machine Translation (Year: 2016).*
(Continued)

*Primary Examiner* — Melanie Torres Williams
(74) *Attorney, Agent, or Firm* — Crowell & Moring LLP

(57) ABSTRACT

A viscous torsional vibration damper or absorber includes a hub part which can be fastened to a crankshaft of an engine, in particular of an internal combustion engine, and an inertia ring which is mounted such that it can be rotated relative to the hub part. A shear gap, which is filled with a silicone oil, is formed between the hub part and the inertia ring, in which shear gap one or more sliding bearing components are arranged for supporting the inertia ring in a slidingly guided manner, wherein the sliding bearing component(s) are composed at least in some regions of a polyphthalamide-containing plastic, with a fraction of 50 wt. % of PP A.

11 Claims, 3 Drawing Sheets

(52) U.S. Cl.
CPC ... *F16F 2224/0241* (2013.01); *F16F 2224/04* (2013.01); *F16F 2226/04* (2013.01); *F16F 2228/007* (2013.01); *F16F 2232/02* (2013.01); *F16F 2236/08* (2013.01)

(56) References Cited

U.S. PATENT DOCUMENTS

| | | | | |
|---|---|---|---|---|
| 5,387,645 | A | 2/1995 | Montag et al. | |
| 6,161,450 | A | 12/2000 | Sandig | |
| 6,306,951 | B1 * | 10/2001 | Montag | F02F 7/006<br>524/505 |
| 2005/0000767 | A1 | 1/2005 | Herrmann | |
| 2016/0033004 | A1 | 2/2016 | Knopf | |
| 2019/0170213 | A1 | 6/2019 | Steidl et al. | |
| 2020/0208713 | A1 | 7/2020 | Knopf et al. | |

FOREIGN PATENT DOCUMENTS

| | | | | |
|---|---|---|---|---|
| CN | 105539872 | A * | 5/2016 | F16M 11/22 |
| CN | 207335886 | U | 5/2018 | |
| CN | 110998137 | A | 4/2020 | |
| DE | 101 26 477 | C1 | 12/2002 | |
| DE | 10 2013 006 751 | A1 | 10/2014 | |
| DE | 10 2016 113 719 | A1 | 2/2018 | |
| WO | WO 2013/171063 | A1 | 11/2013 | |

OTHER PUBLICATIONS

International Search Report (PCT/ISA/210) issued in PCT Application No. PCT/EP2022/067159 dated Nov. 3, 2022 with English translation (4 pages).
German-language Written Opinion (PCT/ISA/237) issued in PCT Application No. PCT/EP2022/067159 dated Nov. 3, 2022 with English translation (8 pages).
German-language Office Action issued in German Application No. 10 2021 116 417.6 dated Feb. 17, 2022 (5 pages).
Cover Page of EP 2 850 330 A1 published Mar. 25, 2015 (1 page).
International Preliminary Report on Patentability (PCT/IB/338 & PCT/IB/373) issued in PCT Application No. PCT/EP2022/067159 dated Jan. 4, 2024, including English translation of document C2 (German-language Written Opinion (PCT/ISA/237), filed on November 20, 2023) (6 pages).
Chinese-language Office Action issued in Chinese Application No. 202280036723.X dated Mar. 10, 2026 with English translation (11 pages).

* cited by examiner

VISCOUS TORSIONAL VIBRATION DAMPER OR VISCOUS TORSIONAL VIBRATION ABSORBER

BACKGROUND AND SUMMARY

The present invention relates to a viscous torsional vibration damper or a viscous torsional vibration absorber.

Viscous torsional vibration dampers or viscous torsional vibration absorbers of the generic type are known per se. Dampers or absorbers of this type are used to reduce torsional vibrations on crankshafts of reciprocating piston engines, vibration damper rings or centrifugal masses being mounted within the housing of dampers or absorbers of this type. Instead of a housing, only a hub which is enclosed by a vibration damper ring can also be used, as disclosed, for example, in DE 10 2016 113 719 A1. Here, the housing or the hub usually have a flange part which can be fastened to a crankshaft of an engine, in particular of an internal combustion engine, the vibration damper ring being rotatable relative to the housing or to the hub, a shear gap being formed which is filled with a liquid shearing medium such as, for example, a silicone oil. In this shear gap which is filled with silicone oil, flange bushings serve to guide and mount the vibration damper ring. Other plain bearing components such as axial bearing rings or else plain bearing plugs are also used, however, to mount the vibration damper ring, possibly also in combination with one another.

These plain bearing components, in particular in the embodiment as flange bushings, are usually inserted without prestress between the two damper housings and the vibration damper ring, in order to allow housing and ring to slide on the flange bushings with as little friction as possible.

It is problematic at high temperatures, in particular at temperatures above 130° ° C. which regularly arise in rotary vibration dampers during driving operation on account of the shearing of the damping medium of silicone oil, that interactions frequently occur between the conventional flange bushings which are as a rule manufactured from polyamide and the silicone oil, which interactions lead to very rapidly progressing degeneration of the viscosity of the silicone oil. For instance, a decrease in the viscosity by 53% after a period of approximately 20 hours has been determined in tests at a rotary viscous vibration damper external temperature of 160° C. The service life of rotary viscous vibration dampers of this type is as a rule 20,000 hours. Here, wear of only 30% is aimed for in this time period.

In order to solve this problem, an attempt might firstly be made to reduce the high operating temperature, which does not appear probable, however, on account of installation space restrictions and relatively high peak pressures of the engines, with the result that the rotary viscous vibration dampers tend to have to be designed for withstanding even higher temperatures and it therefore does not appear appropriate either to design the rotary viscous vibration dampers in such a way that they are not subjected to high temperatures of this type during operation.

DE 10 2013 006 751 A1 discloses a viscous torsional vibration damper of the generic type or a viscous torsional vibration damper which has flange bushings made from a liquid crystal polymer. This material has fundamentally proven to be satisfactorily suitable for use in viscous torsional vibration dampers.

The availability of the material is restricted, however. In addition, the material properties can vary in a manner which is dependent on the state of organization of the respective batch as far as up to the degree of organization of the polymer structure, which results at the same time in a variance between the crystalline and the liquid disordered state.

At the same time, in the case of the use of the LCP bushings, however, the interactions with the silicone oil are very low and, as a consequence, virtually ideal, which overall makes the use of LCP bushings highly advantageous for the application in viscous torsional vibration dampers.

It is therefore an object of the present invention to provide a viscous torsional vibration damper or a viscous torsional vibration absorber which, in a comparative manner to LCP material, ensures a relatively long service life even at temperatures above 130° C. as conventional viscous torsional vibration dampers or absorbers, and improves the viscous torsional vibration damper or absorber even further with regard to its service life.

This object is achieved by way of a viscous torsional vibration damper or a viscous torsional vibration absorber with the features of the independent claims.

A viscous torsional vibration damper or absorber according to the invention has a hub part which can be fastened to a crankshaft of an engine, in particular of an internal combustion engine, and has a vibration damper ring which is mounted rotatably relative to the hub part. The hub part can have a housing or, as disclosed in DE 10 2016 113 719 A1, merely an edge portion of a hub. A shear gap which is filled with a silicone oil and in which one or more plain bearing components are arranged for the slidingly guided mounting of the vibration damper ring is configured between the hub part and the vibration damper ring. The plain bearing component or components is/are formed according to the invention at least in regions from a polyphthalamide-containing plastic, with a proportion of more than 50% by weight of PPA.

The viscous torsional vibration damper or absorber according to the invention is therefore distinguished, in relation to the embodiment of DE 10 2013 006 751 A1, in that the flange bushings consist of a polyphthalamide (PPA). In accordance with the definition of the present invention, this term also includes a modified PPA, preferably an olefin-modified PPA. It has been shown that this material interacts in a more pronounced manner than LCP with silicone oil, but still to a substantially lesser extent, however, in comparison with conventional bearings, for example, made from PA66 or the like.

At the same time, the material is distinguished by satisfactory wear properties on account of the smooth material surface.

In particular, the friction properties of the PPA material are substantially better than a large part of other materials.

The selection of PPA material in comparison with LCP material is surprising, in so far as this is an entirely different material class which interacts to a considerably lesser extent with silicone than previous PA bushings and conversely has better friction properties than LCP bushings. These friction properties improve the service life of the plain bearing overall. Therefore, the PPA material forms an optimized compromise between the conventional PA66 plain bearing components and the LCP plain bearing components in the field of viscous torsional vibration dampers or absorbers.

The use of plain bearing components according to the invention of this type in a viscous torsional vibration damper or absorber also overall makes a longer service life of the viscous torsional vibration damper or absorber possible in comparison with the other torsional vibration dampers with conventional bushings or bearing materials.

The polyphthalamide which is used can be of compressed and/or heat-stabilized configuration. PPA is a semicrystalline partially aromatic polyamide, with the result that different densities come into question in a manner which is dependent on the molecular mass and the crystalline proportion.

The preferred density of the PPA-containing plastic which is used according to the invention in accordance with ISO 1183 (Method A) in the current version from May 2021 lies here, for the abovementioned field of application as plain bearing components in viscous torsional vibration dampers and/or absorbers, between 1.10 and 1.20 g/cm$^3$, particularly preferably 1.13±(0.15) g/cm$^3$.

The manufacturing of the plain bearing components can advantageously take place by way of injection molding.

The material of the plain bearing components can be of fiber reinforced, in particular glass fiber reinforced, configuration. A homogeneous PPA material without glass fibers, however, also has a sufficiently high strength.

The shrinkage during the manufacture in comparison with the molten state is less than 2.5% in accordance with ASTM D955 in the current version from May 2021. This makes manufacturing of the plain bearing component with a highly accurate fit possible.

The glass transition temperature can be above 150° C., and therefore lies outside the typical constant use temperature of a viscous vibration damper which is usually between 110 and 130° C. Temperatures of approximately 150° C. can occur briefly during use, but it has been surprisingly shown that the PPA material of the plain bearing component can withstand these brief temperature peaks without extensive material changes.

Therefore, the polyphthalamide as a material for plain bearing components of viscous vibration dampers has proven to be an excellent compromise solution for improving the friction properties with, at the same time, a small deterioration of the interaction with silicone oil in comparison with LCP material and with consideration of the boundary conditions relating to mechanical stability, vibration and temperature stability of plain bearing components for the field of application of viscous vibration dampers.

In the following text, one exemplary embodiment of the invention will be explained in greater detail on the basis of the appended drawings.

DETAILED DESCRIPTION OF THE DRAWINGS

In the following description of the figures, terms such as top, bottom, left, right, front, rear, etc. relate exclusively to the exemplary illustration and position, selected in the respective figures, of the viscous torsional vibration dampers, flange bushing, vibration damper ring and the like. These terms are not to be understood as restrictive; that is to say, these references can change as a result of different working positions or the mirror-symmetrical design or the like.

Figure 1:
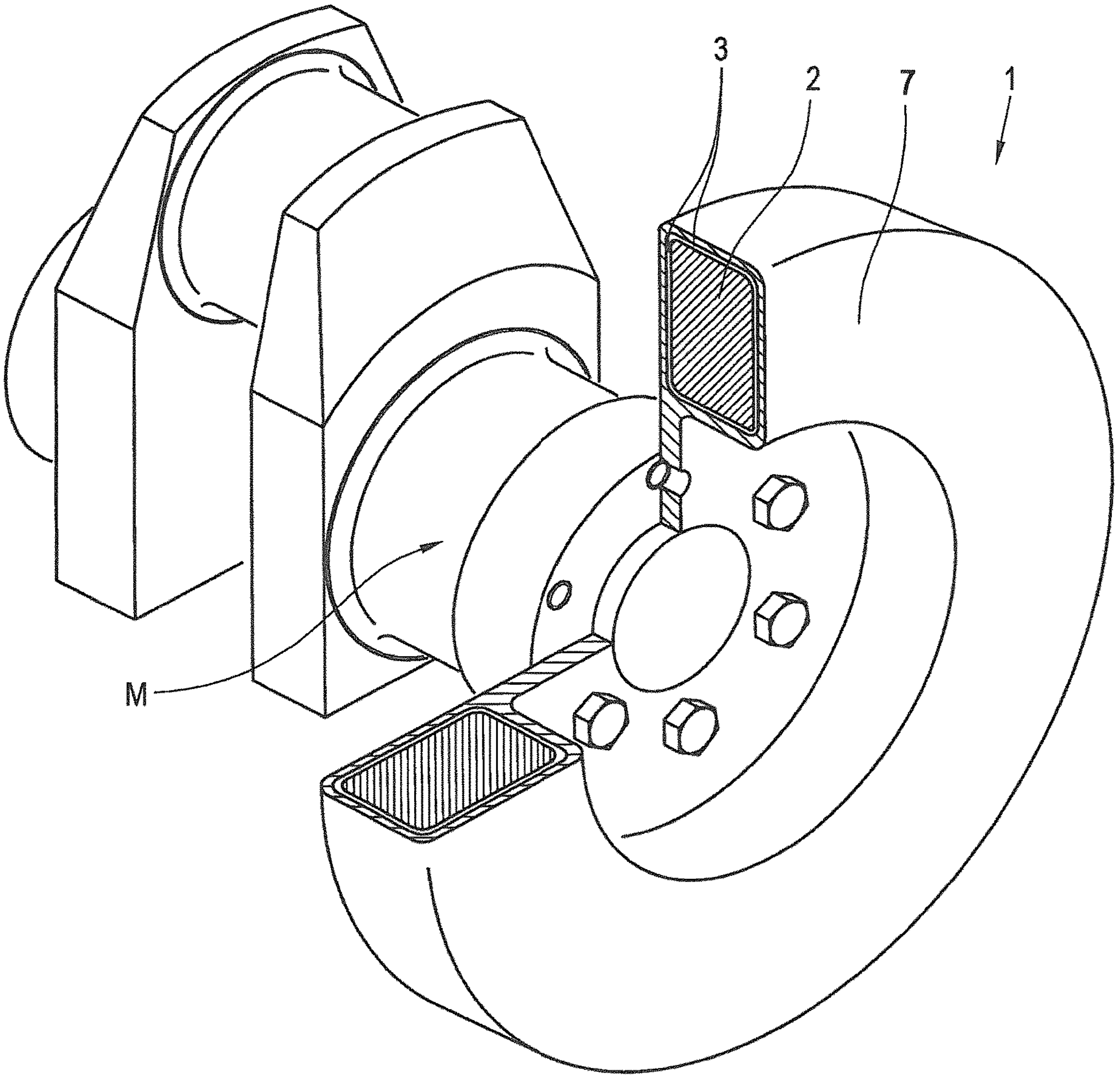
FIG. 1 is a perspective partial sectional illustration of a viscous torsional vibration damper or viscous torsional vibration absorber according to an embodiment of the invention.

In FIG. 1, the designation 1 overall denotes one design variant of a viscous torsional vibration damper or viscous torsional vibration absorber according to the invention. Here, the viscous torsional vibration damper or absorber has substantially an annular housing 7 which is connected fixedly to the crankshaft M of an engine for conjoint rotation. A vibration damper ring 2 is arranged within the housing 7, which vibration damper ring 2 is surrounded by a silicone oil which serves as damping medium and fills a shear gap 3 between the housing 7 and the vibration damper ring 2.

Figure 2:
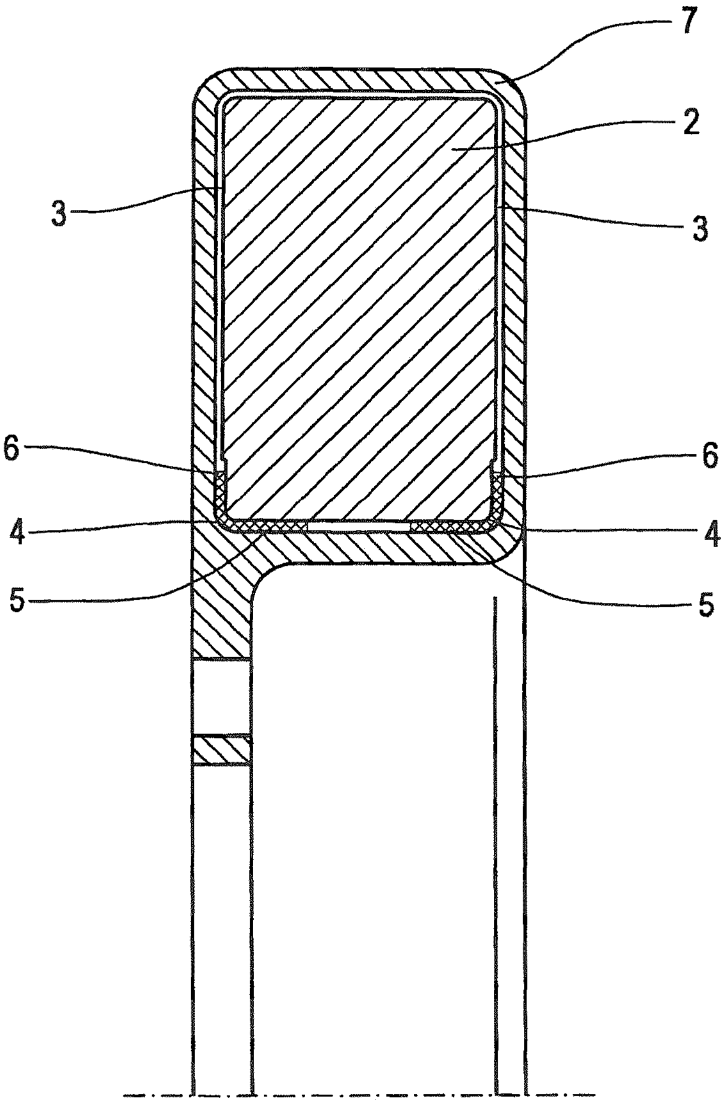
FIG. 2 is a cross-sectional illustration of the viscous torsional vibration damper or viscous torsional vibration absorber from FIG. 1.

As can be seen clearly in FIG. 2, the vibration damper ring 2, which is mounted loosely on the housing 7, is by way of plain bearing components 4 in the form of flange bushings with the preferred L-shaped cross section 5, 6, by way of which the vibration damper ring is guided radially and axially in the housing. Here, the plain bearing components 4 lie in a shear gap 3 between the vibration damper ring 2 and the housing 7, the shear gap 3 being filled with silicone oil.

In order as far as possible to avoid damage, in particular a reduction of the viscosity, of the silicone oil as a result of interactions with the material, from which the flange bushings are produced, the flange bushings are manufactured from a polyphthalamide (PPA). Using PPA-manufactured flange bushings 4 of this type, a reduction in the viscosity decrease in the silicone oil in comparison with PA66 flange bushings can be seen, which brings about a considerable extension of the service life.

The use of flange bushings of this type which are produced from polyphthalamide makes it possible to save materials such as, for example, fan disks which bring about cooling of the silicone oil which heats up during operation in the case of conventional viscous torsional vibration dampers or absorbers, in order to keep the damage of the silicone oil as low as possible using the flange bushings produced in the prior art from polyamide compounds used up to now.

At the same time, an extension of the durability of the plain bearing component and the plain bearing overall is achieved by way of the friction properties of the material used which are improved in comparison with liquid crystal polymers.

Figure 3:
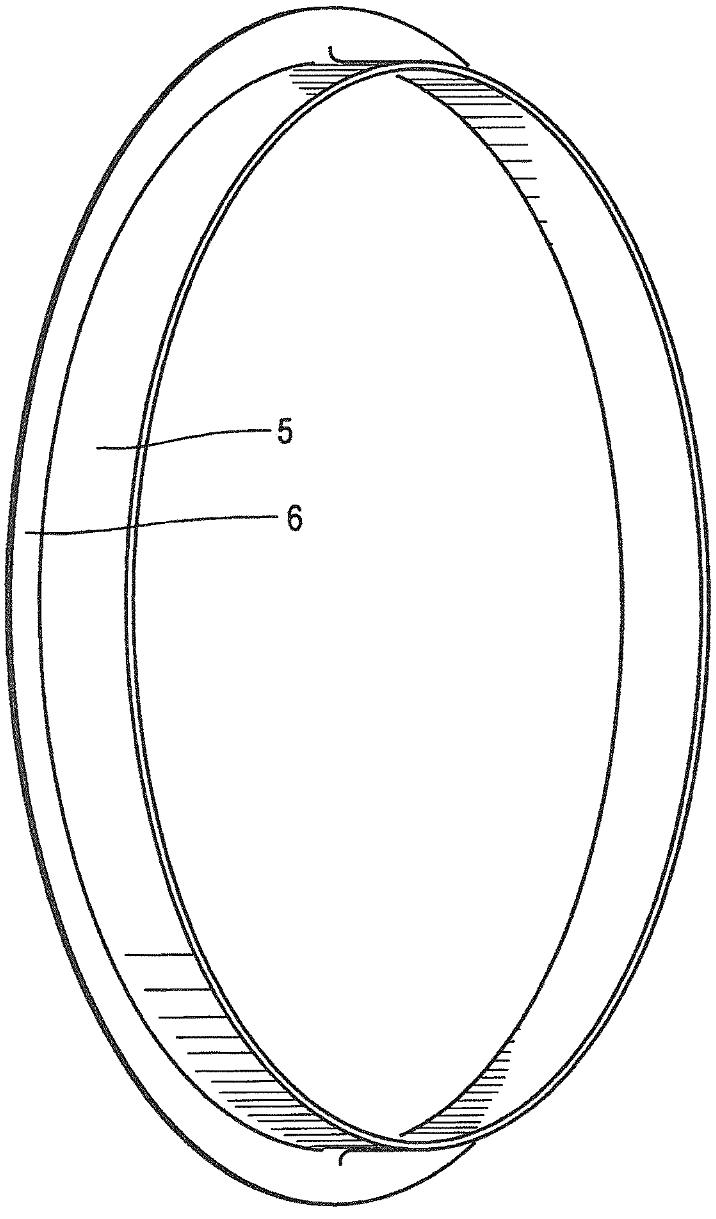
FIG. 3 is a perspective view of one design variant of a flange bushing.

Within the context of the present invention, the term of a plain bearing component 4 is not restricted to a flange bushing from FIGS. 1-3. One or more axial bearing rings for sliding mounting of the vibration damper ring or one or more plain bearing plugs for sliding mounting of the vibration damper ring can also be understood within that term. Alternative bearing elements of this type from the field of viscous torsional vibration dampers are known to a person skilled in the art.

The plain bearing component can also be manufactured as a composite component, and merely one segment, for example in the embodiment of an axial bearing ring, can have a plain bearing ring made from polyphthalamide and a supporting ring made from metal.

Here, the plain bearing component is of single-piece and, in particular, coating-free configuration, with the result that the plain bearing component is in contact with the silicone oil at least in regions.

The plain bearing component or components is/are advantageously of particularly thin configuration. They can thus be arranged in a shear gap with a gap width of less than 0.5 mm. At the same time, they have a high mechanical strength as a result of the material selection of PPA.

Specifically, the plain bearing component or components can have an L-shaped cross section, as can also be seen from FIG. 2. As a result, mounting of the vibration damper ring 2 from two sides, radially and axially, is possible. This double mechanical friction loading can, however, be withstood by the plain bearing component made from PPA without problems and over a long operating time period.

The PPA can also be olefin-modified, in particular polyethylene or PE-modified, for example by 10-20% by weight. Additives up to less than 7% can also be contained in the plastic. The actual plastic of the plain bearing component can therefore be pure PPA or a blend and/or copolymer of PPA and PE; the predominant proportion, that is to say more than 50% by weight, is always a PPA, however. Therefore, within the context of the present invention, a plain bearing component made from PPA is to be understood to mean a plain bearing component with a plastic which is formed predominantly from PPA.

LIST OF DESIGNATIONS

1 Viscous torsional vibration damper or viscous torsional vibration absorber
2 Vibration damper ring
3 Shear gap
4 Flange bushing
7 Housing
M Crankshaft

The invention claimed is:

1. A viscous torsional vibration damper or absorber, comprising:
- a hub part which is fastenable to a crankshaft of an engine;
- a vibration damper ring which is mounted rotatably relative to the hub part;
- a shear gap, which is filled with a silicone oil, formed between the hub part and the vibration damper ring;
- one or more plain bearing components arranged in the shear gap for slidingly guided mounting of the vibration damper ring, wherein
- the one or more plain bearing components are composed at least in some regions of a polyphthalamide-containing plastic, with a fraction of more than 50% by weight of PPA,
- the one more plain bearing components are configured as flange bushings, an axial bearing ring, and/or a plain bearing plug, and
- the material of the plain bearing ring made from polyphthalamide has a density of between 1.10 and 1.20 $g/cm^3$.

2. The viscous torsional vibration damper or absorber according to claim 1, wherein
- the one or more plain bearing components are configured as an injection-molded shaped body.

3. The viscous torsional vibration damper or absorber according to claim 1, wherein
- the material of the plain bearing ring made from polyphthalamide has a density of $1.13 \pm (0.15)$ $g/cm^3$.

4. The viscous torsional vibration damper or absorber according to claim 1, wherein
- one plain bearing component is of a single-piece and coating-free configuration, whereby the one plain bearing component is in contact at least in regions with the silicone oil.

5. The viscous torsional vibration damper or absorber according to claim 1, wherein
- the plain bearing component has a fiber reinforced configuration.

6. The viscous torsional vibration damper or absorber according to claim 1, wherein
- the plain bearing component has a glass fiber reinforced configuration.

7. The viscous torsional vibration damper or absorber according to claim 1, wherein
- the plain bearing component contains a homogeneous, fiber-free, polyphthalamide material.

8. The viscous torsional vibration damper or absorber according to claim 1, wherein
- the material of the plain bearing component has a shrinkage in comparison with a molten state of less than 2.5%.

9. The viscous torsional vibration damper or absorber according to claim 1, wherein
- the one or more plain bearing components are arranged in the shear gap with a gap width of less than 0.5 mm.

10. The viscous torsional vibration damper or absorber according to claim 1, wherein
- the one or more plain bearing components have an L-shaped cross section in order to mount the vibration damper ring from two sides.

11. A viscous torsional vibration damper or absorber, comprising:
- a hub part which is fastenable to a crankshaft of an engine;
- a vibration damper ring which is mounted rotatably relative to the hub part;
- a shear gap, which is filled with a silicone oil, formed between the hub part and the vibration damper ring;
- one or more plain bearing components arranged in the shear gap for slidingly guided mounting of the vibration damper ring, wherein
- the one or more plain bearing components are composed at least in some regions of a polyphthalamide-containing plastic, with a fraction of more than 50% by weight of PPA, and
- the material of the plain bearing component has a shrinkage in comparison with a molten state of less than 2.5%.

* * * * *